June 11, 1963  P. H. MOON  3,093,184
TOOL FOR FORMING HELICES OR EYES IN WIRES
Filed Sept. 30, 1960

INVENTOR.
PAUL H. MOON
BY Owen & Owen
ATTORNEYS

United States Patent Office 3,093,184
Patented June 11, 1963

3,093,184
TOOL FOR FORMING HELICES OR EYES
IN WIRES
Paul H. Moon, Fremont, Ohio, assignor, by mesne assignments, to Kelsey-Hayes Company, a corporation of Delaware
Filed Sept. 30, 1960, Ser. No. 59,707
2 Claims. (Cl. 153—67)

This invention relates to a tool for forming helices or eyes in the ends of wires.

Although many tools of the general nature with which the present invention is concerned are known in the art, the present helix-forming tool has several advantages over those now known. The new tool includes pivoted handle members with jaws near the pivot point and with a projection or pin extending outwardly from each side of the pivot point to provide means about which a wire may be wrapped during the helix-forming operation. The pin is of a relatively large diameter at one end and of a smaller diameter at the other end so that helices of two different sizes can be made. By locating the pin at the pivot point, the tool can be manufactured more easily and the jaws are always in proper alignment with the pin. A key is provided which fits over either end of the pin and which has means to engage the wire and wrap it around the pin. When the coil is formed, it then can be cut to a desired length by means of wire cutters which also constitute part of the tool.

Wire coils made with the tool according to the invention are particularly useful for forming control wires for heaters, chokes, and the like in automobiles. The two sizes of coils or helices made with the new tool accommodate almost all automotive applications which are encountered.

It is, therefore, a principal object of the invention to provide a tool for forming wire helices, which tool includes a pin located at a pivot point thereof and which extends outwardly therefrom. Another object of the invention is to provide a coil-forming tool in which a pin extends outwardly on both sides thereof and is of two different diameters for making coils of two different sizes.

Still another object of the invention is to provide a helix-forming tool which is easier to manufacture and to manipulate.

Figure 1:
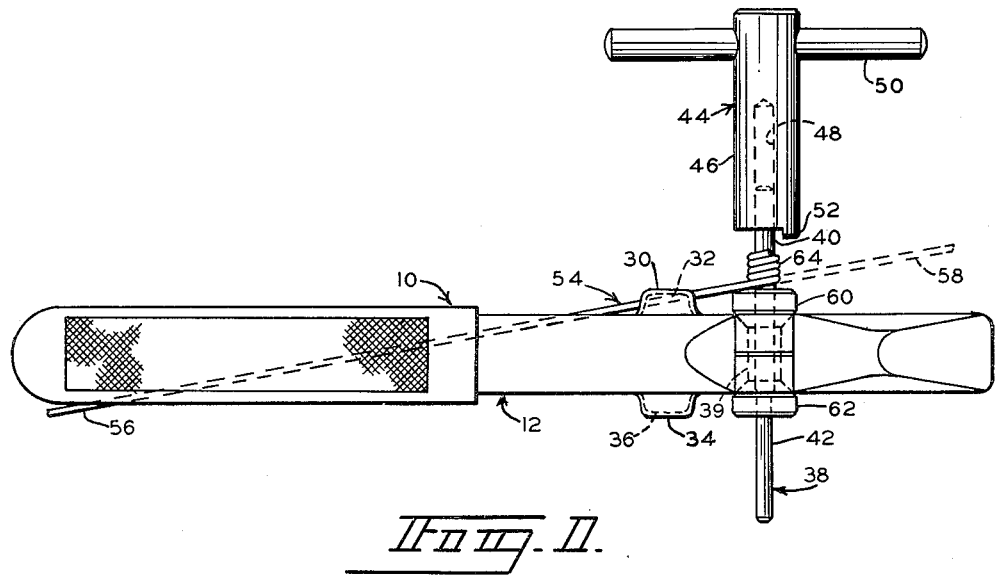
Figure 2:
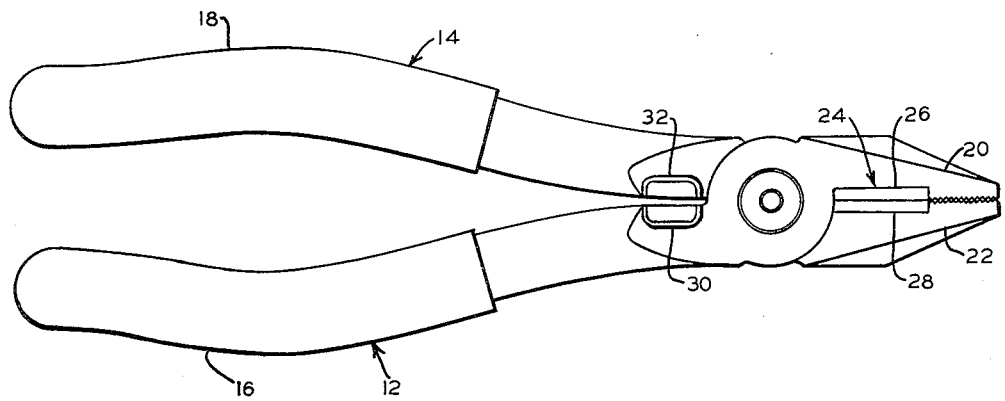

Other objects and advantages of the invention will be apparent from the following detailed description of a preferred embodiment thereof, reference being made to the accompanying drawing, in which:

FIG. 1 is a side view of a tool and a key according to the invention and a wire helix formed therewith; and FIG. 2 is a top view of the tool shown in FIG. 1 without the key and wire helix.

Referring to the drawing, a tool 10 includes pivoted members 12 and 14 which have handles 16 and 18 and nose jaws 20 and 22, respectively. The tool 10 also includes a wire cutter 24 formed by blade portions 26 and 28 constituting part of the pivoted members 12 and 14. To this point, the tool 10 is not significantly unlike many pairs of cutting pliers now known in the art.

Wire jaws 30 and 32 are formed on one side of the members 12 and 14, respectively, and wire jaws 34 and 36 are formed on the opposite side. By positioning the wire jaws 30, 32 and 36, 40 between the handles 16 and 18 and the pivot point, the wire to be formed can be manipulated more easily with one hand, while the tool 10 is being held with the other hand, than if the wire jaws were positioned on the opposite side of the pivot point, opposite the handles 16 and 18.

A pin 38 extends through a pivot rivet 39 and through both of the pivoted members 12 and 14 at the pivot point thereof, it being positioned perpendicular to a plane in which the members 12 and 14 pivot. The pin 38 includes a large cylindrical projection 40 extending outwardly from one side of the pivoted members 12 and 14 and a small cylindrical projection 42 extending outwardly from the opposite side of the pivoted members 12 and 14. The two sizes of projections 40 and 42 on the pin 38 enable helices of two different sizes to be formed, these two sizes being sufficient for the vast majority of uses in the automotive field. By way of example, the large cylindrical projection 40 has a diameter of 0.186 inch and the small cylindrical projection 42 has a diameter of 0.155 inch to form helices with central openings having corresponding diameters.

A key 44 has a main body 46 centrally bored to form a cylindrical recess 48 which is large enough to fit over either of the projections 40 and 42. The key 44 also includes a handle 50 and an extension 52.

In operation, a wire 54 of desired diameter is placed at a shallow angle to the horizontal in the jaws 30 and 32, when a helix with an opening of larger diameter is desired, and in the jaws 34 and 36 when a helix with a smaller opening is desired. One end 56 of the wire 54 extends between the handles 16 and 18 and a free end 58 of the wire 54, which end is indicated by dotted lines, extends past the projection 40, tangentially thereto. With the wire so positioned, the key 44 is moved onto the projection 40 until the end extension 52 contacts a disc 60 which forms a bearing surface for the key 44. A similar disc 62 is located on the opposite side of the tool, both discs being coaxial with the pin 38 and press fit thereon. When the end extension 52 of the key 44 contacts the disc 60, it is positioned to that the wire 54 is between the extension 52 and the projection 40, the extension being spaced from the recess 48 a sufficient distance to provide ample room for the wire 54. The handle 50 is then turned, counterclockwise in the present instance, so as to twist the free end 58 of the wire 54 around the projection 40 until all of the free end 58 is twisted into a helix or eye 64.

If the free end 58 of the coil is longer than is subsequently found to be necessary, this end can be cut off by means of the cutting blades 24 with the remaining part then wound on the pin 38. In any case, the cutters 24 are used to cut the longer end 56 of the wire 54 to desired length after the helix 64 is made.

By placing the projections 40 and 42 at the pivot point of the pivoted members 12 and 14 which carry the wire jaws 30, 32 and 34, 36, the jaws are always aligned with the projections, this being true regardless of the size wires employed. The arrangement also enables easier manipulation or operation of the tool with the projections 40 and 42 always remaining in a fixed position even while the pivoted members 12 and 14 are being opened or closed. Operation is also facilitated by the use of the discs 60 and 62 which enable the key 44 to be turned more easily when it is initially rotated. The discs 60 and 62 also extend outwardly at least as far as the corresponding wire jaws 30, 32 and 34, 36 so that the jaws will not interfere with wires wound around the corresponding projections 40 and 42.

Various modifications of the above described embodiment of the invention will be apparent to those skilled in the art and it is to be understood that such modifications can be employed without departing from the scope of the invention, if within the spirit and tenor of the accompanying claims.

I claim:

1. A tool for forming helices in wire, said tool comprising a pair of pivoted members pivotally connected one to another, said members forming handles and jaws for holding a wire, a cylindrical projection extending from the pivot point of said members in a line perpendicular to a plane in which said members pivot, each of said jaws being aligned with said projection regardless of the position of said handles, a disc concentrically mounted on said projection adjacent said pivoted members, said disc extending from said handle substantially at least as far as said jaws so that said jaws cannot interfere with a wire when wound around said projection, and means cooperating with said projection for wrapping therearound a wire held in said jaws.

2. A tool for forming helices in wire, said tool comprising a pair of pivoted members pivotally connected to one another, said members having handles and jaws between the handles and the pivot point for holding a wire, said jaws extending perpendicular to a plane in which said members pivot, a cylindrical projection extending through the pivot point in co-axial relationship with respect thereto and along a line perpendicular to the pivot plane, each of said jaws being aligned with said projection in all positions of said handles when said jaws are both opened and closed, and means cooperating with said projection for wrapping therearound a wire held by said jaws.

References Cited in the file of this patent

UNITED STATES PATENTS

| | | |
|---|---|---|
| 237,397 | Lewthwaite | Feb. 8, 1881 |
| 2,774,392 | Corne | Dec. 18, 1956 |
| 2,809,676 | Kirkwood | Oct. 15, 1957 |